Figure 1:
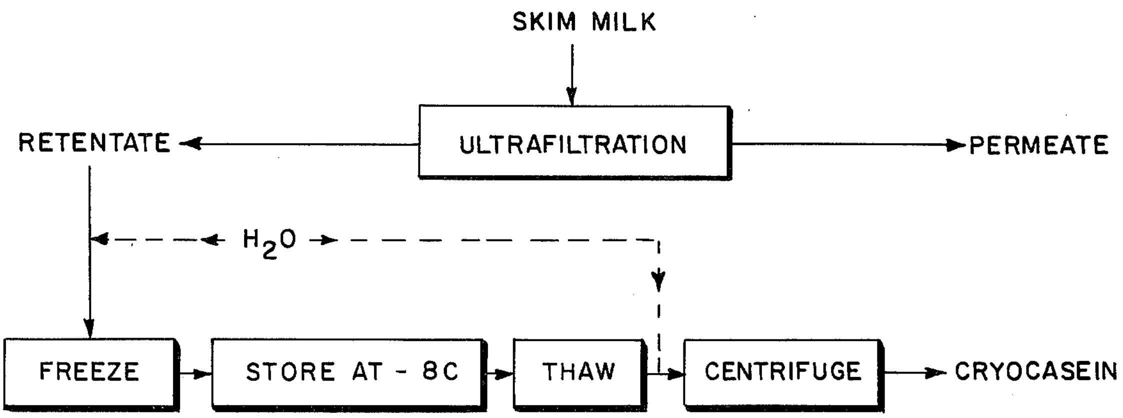

United States Patent [19]
Lonergan

[11] Patent Number: 4,462,932
[45] Date of Patent: Jul. 31, 1984

[54] ISOLATION OF NATIVE CASEIN BY CRYODESTABILIZATION

[75] Inventor: Dennis A. Lonergan, Oakdale, Minn.

[73] Assignee: Purdue Research Foundation, West Lafayette, Ind.

[21] Appl. No.: 506,792

[22] Filed: Jun. 22, 1983

[51] Int. Cl.[3] .......... A23J 1/20; A23J 1/22
[52] U.S. Cl. .......... 260/119; 260/120; 426/564; 426/573; 426/580; 426/657
[58] Field of Search .......... 260/119, 120

[56] References Cited

U.S. PATENT DOCUMENTS 2,744,891 5/1956 Waugh .......... 260/120
4,126,607 11/1978 Eastin .......... 260/119

FOREIGN PATENT DOCUMENTS 2035330 6/1980 United Kingdom .

OTHER PUBLICATIONS

J. of Dairy Science, vol. 62, No. 6, Jun. 1979, pp. 869–875, Brule et al.
J. of Food Science, 46, 1603–1611 (1981), Lonergan et al.
J. of Food Science, 46, 1592–1596 (1981), Minson et al.
J. of Food Science, 46, 1597–1602 (1981), Minson et al.

*Primary Examiner*—Howard E. Schain
*Attorney, Agent, or Firm*—Barnes & Thornburg

[57] ABSTRACT

A casein isolate which is substantially dispersible in water is disclosed along with the method of isolating this dispersible casein from skim milk. To isolate the casein, skim milk is filtered through a membrane of a type through which casein generally does not pass to concentrate the retentate to about a 4X VCR concentration. The retentate is stored at a temperature below the freezing point of the retentate for about four days. The retentate is diluted with a suitable diluent, such as water, in an amount sufficient to prevent gelling of the retentate. The casein is then substantially separated from the diluent and other materials in the retentate. Normally, this separation is performed by centrifugation.

33 Claims, 2 Drawing Figures

ISOLATION OF NATIVE CASEIN BY CRYODESTABILIZATION

This invention relates to a method for isolating native casein, and more particularly to a method of isolating native casein from milk by cryodestabilization and the product formed thereby.

Casein is a protein isolate that is widely used in the food industry. It comprises a mixture of related phosphoproteins which occur in milk, cheese, beans, and nuts. In bovine milk, it is present to the extent of 3%. It is one of the most nutrive milk proteins in that it contains all of the common amino acids and is rich in essential amino acids. It is produced in animals in mammary tissue from amino acids supplied by the blood. Casein is used in the manufacture of molded plastics, adhesives, paints, textile finishes, paper coatings, and man-made fibers. Vitamin-free casein is used in the diets of animals which are employed for the biological assay of vitamins. Medicinal grades of casein are used in dietetic preparations and for determining the effectiveness of digestive enzyme preparations containing pepsin, trypsin, and papain.

It is typically produced by the addition of acid or rennet to skim milk. Although the addition of acid and the addition of rennet to skim milk are effective means of isolating casein from skim milk, they result in products that are water-insoluble. Casein is made water-soluble or dispersible by treatment of acid-treated casein with an alkali, typically calcium, potassium, or sodium hydroxide and heat. The resulting slurry (20 to 25% solids) is spray-dried, yielding calcium, potassium, or sodium caseinate, respectively.

Another method for the preparation of casein by combining membrane ultrafiltration and ultracentrifugation is discussed in Brule et al, *Preparation of "Native" Phosphocaseinate by Combining Membrane Ultrafiltration and Ultracentrifugation,* 62 *J. Dairy Sci.* 869 (1979). The method described by Brule et al discloses the isolation of casein through ultrafiltration followed by ultracentrifugation having centrifugal fields varying from 44,000×g to 105,000×g at elevated temperatures.

Eastin U.S. Pat. No. 4,126,607 discusses a method of producing edible calcium phosphocaseinates by the process of adding edible dibasic sodium, potassium salts of phosphoric acid, and calcium hydroxide to a casein-water slurry to bring the pH of the mixture between 6.5 to 7.5. The resulting mixture is then heated and spray-dried.

British Pat. No. 2,035,330 discusses the separation of protein from milk by heating the milk to partially denature the protein, separating the proteins from other non-fat constituents by ultrafiltration, and subjecting the retentate fraction containing the proteins to a complementary heat treatment to further denature the proteins.

Minson et al, *Efficacy of Various Carbohydrates as Cryoprotectants for Casein in Skim Milk,* 46 *J. Food Sci.* 1957 (1981) discusses the effect of the removal of carbohydrates, such as lactose, on the stability of casein in frozen milk. Minson et al, in searching for a method of maintaining protein stability in frozen milk, determined which carbohydrates had the greatest cryoprotectant effect. See also Minson et al, *Accelerated Tests for Evaluating Protein Stability in Frozen Skim Milk,* 46 *J. Food Sci.* 1592 (1981).

Prior to the instant invention, there has been no commercially practicable way for isolating casein which could be returned to its native state as a micellar colloidal dispersion. This invention seeks to find the conditions which would maximize both the rate and extent of casein cryodestabilization, to maximize the commercial viability of this process.

In accordance with the instant invention, a method is provided for isolating native casein from milk. The milk is filtered through a membrane of a type through which casein generally will not pass. The retentate is saved from the filtration process, and is stored at a temperature below the freezing point of the retentate. The casein is substantially separated from the other materials in the retentate.

Preferably, the milk is filtered to concentrate it to at least about a four times volume concentration ratio (VCR). VCR is defined as the initial volume of milk divided by the volume of retentate at any point during ultrafiltration or diafiltration. Additionally, a suitable diluent can be added to the retentate in an amount sufficient to prevent gelling of the retentate.

Also according to the instant invention, a casein isolate is provided which is substantially dispersible in water. The casein is isolated from milk by a process which comprises the following steps: milk is filtered through a membrane through which casein generally will not pass. The retentate is then stored at a temperature below the freezing point of the retentate. Casein is then separated substantially from the other materials in the retentate.

One aspect of the instant invention is that the casein which is isolated by the instant invention is water-soluble, due to the fact that the native structure of the casein is not disturbed. This has the advantage of eliminating the need for the addition of alkali to the casein to resuspend the casein in water. Casein is currently precipitated from milk by the addition of acid or renin. Either method disrupts the native structure of casein and results in a casein precipitate which can only be resuspended by the addition of alkali and heat.

An advantage of casein which retains its native structure is that native casein may have utility in applications in the food industry for which a conventional alkali metal caseinate is not suitable. Additional uses of casein would, of course, benefit the dairy industry.

Another aspect of the instant invention is that by eliminating the acid required for precipitation and the alkali required for resolubilization, material costs associated with the processing of casein can be reduced.

Figure 2:
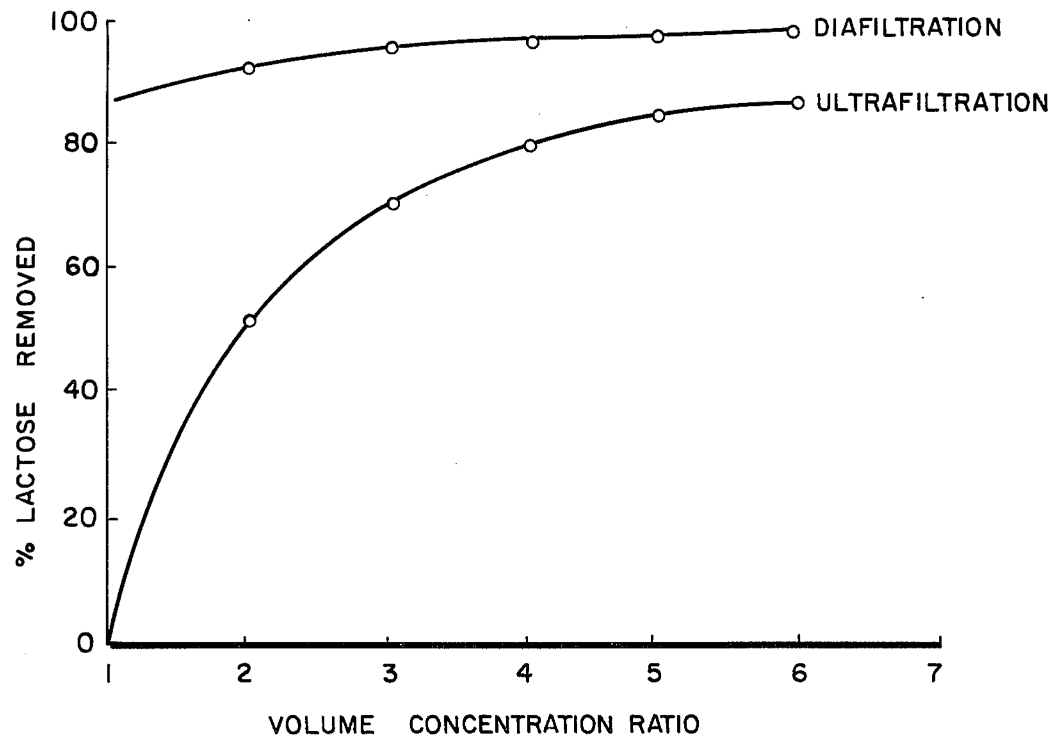

Various features and advantages of the invention will become apparent to those skilled in the art upon consideration of the following detailed description of an embodiment of the invention. The detailed description particularly refers to the accompanying drawings in which:

FIG. 1 is a block diagram illustrating the instant process for isolating casein; and FIG. 2 is a graph illustrating the removal of lactose from milk as a function of the volume concentration ratio for both ultrafiltration and diafiltration.

The processing scheme used in isolating casein is illustrated in FIG. 1. Skim milk is supplied to an ultrafilter comprising a membrane of a type through which casein will generally not pass. The retentate obtained from the filtration process is then saved, frozen, and stored at −8° C. for a period of time. After the storage period, the retentate is thawed and centrifuged to separate the casein from other materials in the retentate. As illustrated, water can be added as a diluent to prevent the casein from gelling either before the retentate is frozen or after the retentate is thawed.

In the examples discussed below, diafiltration involved ultrafiltering skim milk to a 6X VCR, adding distilled water to the retentate to dilute it to a 1X VCR and then again ultrafiltering the diluted retentate to a 6X VCR.

In a working example, raw bulk milk was obtained, heated to 38°–43° C., separated, and pasteurized at 63° C. for 30 minutes. This process yielded pasteurized skim milk. The skim milk was ultrafiltered or diafiltered using two hollow-fiber membrane cartridges manufactured by Romicon, Inc., Woburn, Mass. The membranes were connected in a parallel. The membranes were PM-50 polysulfone membranes with a molecular weight cutoff at 50,000 daltons, an internal fiber diameter of 1.1 mm and a surface area of 1.39 $m^2$ per cartridge. During ultrafiltration or diafiltration, the temperature was maintained at 55°–57° C. and the inlet and outlet pressures were held at 170 KPa and 70 KPa, respectively. Milk was circulated through these membranes with an Alfa-Laval LH1 MMR 3 HP (3450 rmp) centrifugal pump. A 250 micron prefilter was used in-line before the membranes. With these operating conditions, 170 liters of skim milk were ultrafiltered to a 6X VCR in approximately 75 minutes.

After ultrafiltration or diafiltration, samples were cooled and stored at 4±2° C. until frozen. Samples were always frozen within 6 hours of processing.

Samples of approximately 20 ml were placed in glass screw-cap tubes (17×125 mm) and frozen in still air at −20°±2° C. for 20–24 hours. Samples were then placed at −8°±0.5° C. for the remainder of frozen storage. Data is available which indicates that the rate of cryodestabilization is maximized at approximately −8° C. See, e.g., Koschack et al, *Protein Stability in Milk as Influenced by Storage Temperature and Ultrafiltration,* 46 *J. Food Sci.* 1211 (1981); Nakanishi et al, *Studies on the Changes of Milk Casein by Various Treatments Part II; The Effect of Frozen Storage on the Milk Casein,* 29 *Agr. Biol. Chem.* 1099 (1965); and Bell et al, *Stability of Milk and Its Concentrates in Frozen Storage at Various Treatments,* 35 *J. Diary Sci.* 1 (1952). Samples were thawed in an ethanol bath at 0°–5° C. for 1–1.5 hours. This slow, gradual thawing procedure was employed to minimize heat treatments that could reverse cryodestabilization. It will be appreciated by those skilled in the art that other thawing procedures could be utilized. It is important, however, in thawing the frozen retentate that the retentate not be thawed in a manner which will cause the protein to denature because of the heat applied to the protein.

Samples of undiluted ultrafiltered retentate were thawed as described previously. A volume of distilled water at 0° C. was added to these thawed samples such that the samples were returned to a 1X VCR. Each diluted sample was then mixed with a mixer such as the Tissumizer manufactured by Tekmar Co. of Cincinnati, Ohio for 5 seconds at one-half max speed. The samples were then centrifuged and assayed for casein precipitation as will be described.

The following analytical methods were employed in arriving at the results herein discussed. All determinations were made in duplicate. The tabulated data represent the means of the values obtained in the tests unless otherwise noted.

Total protein was determined by the Amido Black method described by Dolby in *Dye Binding Methods for Estimation of Protein in Milk,* 30 *J. Dairy Sci.,* 43 (1961). Values for Amido Black dye-binding were converted to percent protein by calibration versus protein as determined by Kjeldahl in *Official Methods of Analysis,* 9th Ed., Ass'n of Official Anal. Chem., Wash. D.C. (1960). The concentration of whey proteins was determined using the method for total protein following removal of casein as described by Aoki and Imamura in *Cold Disaggregation of the Casein Micelles in Heated Concentrated Whey Protein-Free Milk,* 39 *Agr. Biol. Chem.* 2017 (1975). The amount of casein was determined by subtracting the value for whey proteins from the value for total protein.

Cryodestabilization of casein and whey proteins was quantified by centrifuging a measured volume (approximately 20 ml) of thawed sample at 5,000×g max for 10 minutes at 0°–5° C., measuring the volume of supernatant fluid and determining the concentration of casein and whey proteins in this supernatant fluid. Values for the original concentration of casein and whey proteins in the sample and a material balance were then used to determine the percentage of casein and whey proteins originally present that had precipitated.

The pH of the samples was determined with an Orion Model 701A pH meter and a Corning Model 476051 combination electrode. The samples were thawed as described previously and then held at 0° C. in an ice-water bath. Calibration buffers were also held at 0° C. in this ice-water bath and all calibrations and readings were made at this temperature.

The lactose content of samples was determined by the colorimetric methods used for reducing sugars described in Nelson, *A Photometric Adaptation of the Somogyi Method for the Determination of Glucose,* 153 *J. Biol. Chem.* 375 (1944); Somogyi, *A New Reagent for the Determination of Sugars,* 160 *J. Biol. Chem.* 61 (1945); and Somogyi, *Notes on Sugar Determination,* 195 *J. Biol. Chem.* 19 (1952). Samples were clarified prior to analysis by the addition of 25 ml $H_2O$, 10 ml 0.15 M $Ba(OH)_2$ and ml 0.15 M $ZnSO_4.7H_2O$ to 5 ml of sample and filtration through Whatman's No. 1 filter paper. The method was calibrated by analyzing solutions of known lactose content. Percent recovery of added lactose ranged from 98%–104%. Analysis of variance was done using a mixed model least squares and maximum likelihood computer program described in Harvey, *Least-Squares Analysis of Data with Unequal Subclass Frequencies, U.S.D.A. Agricultural Research Service ARS H-4* (1975).

The results obtained from the experiments which were conducted are reported in FIG. 2 and Tables 1–11.

The removal of lactose from skim milk as a function of the extent of ultrafiltration and diafiltration is illustrated in FIG. 2. The removal of calcium, phosphorus, and water during ultrafiltration and diafiltration has been discussed in Lonergan et al, *Stability of Proteins in Ultrafiltered Low Lactose Milk Concentrate Dairy Frozen Storage,* 46 *J. Food Sci.* 1603 (1981); and Lonergan, *Ultrafiltration and Diafiltration's Effect on Casein Molecules, Transactions of the ASAE* (1983). With the 50,000 mol. wt. cutoff membranes used in these studies, small but significant amounts of whey proteins were also removed. Approximately 16% of the whey proteins was removed from the skim milk which was ultrafiltered to a 4X VCR, and approximately 21% of the whey proteins was removed upon ultrafiltration to a 6X VCR.

The effect of the extent of ultrafiltration and time of storage at −8° C. on casein precipitation is illustrated in Table 1.

TABLE 1

EFFECT OF ULTRAFILTRATION ON CRYODESTABILIZATION OF CASEIN

| Extent of Ultrafiltration (VCR) | % Casein Precipitated After Storage at −8° C.[a] 1 wk. | 2 wk. | 3 wk. | 4 wk. |
|---|---|---|---|---|
| 1 | 0.2(0.4) | 14(14) | 16(8) | 15(10) |
| 2 | 19(21) | 68(35) | 90(10) | 93(5.8) |
| 4 | 94(4.8) | 98(1.9) | 99(0.3) | 99(0.2) |
| 6 | 98(2.4) | 100(0.5) | 99(1.0) | 99(0.5) |

[a]Arithmetic means of 4 to 6 samples from 3 ultrafiltration trials. Standard deviations are enclosed in parentheses.

These data demonstrate that: (1) the extent of casein precipitation increases as the extent of ultrafiltration increases from 1X VCR to 6X VCR: (2) the extent of casein precipitation increases as storage time at −8° C. increases from 1 to 4 weeks; and (3) at relatively large extents of ultrafiltration (4X or 6X VCR) essentially complete precipitations of casein can be accomplished after 1–2 weeks of storage at −8° C. This last finding affects the practical use of cryodestabilization as a method for commercially isolating casein. For instance, if it were possible to recover only 75% of the casein from skim milk by cryodestabilization, the method perhaps would not be of potential commercial interest. Further, the use of a 1–2 week storage time requires an expenditure of less energy than storage for four weeks. Thus, processing costs can be reduced to a commercial level by reducing the storage time necessary to precipitate the casein.

Samples ultrafiltered to either a 4X or a 6X VCR and stored at −8° C. for 1–4 weeks gelled when thawed. Centrifugation compacted this gel only slightly to give a relatively small volume of supernatant fluid. The volume of supernatant fluid was approximately ½ to ¼ of the volume of 4X and 6X VCR samples, respectively. Although the gelling of the casein does not present a problem in terms of recovery of casein, it is not desirable in terms of optimizing the isolation of pure casein. That is, the presence of a large volume of gelled casein hinders the further removal of water-soluble components such as lactose and soluble whey proteins. It was found that two approaches could be taken to solve this problem. One approach was to add water to the retentate following the ultrafiltration of the skim milk but before the freezing of the retentate. A second approach was to add water to the thawed, undiluted retentate before centrifuging the retentate.

The results of experiments wherein water was added to 4X and 6X VCR retentates before freezing appear in Table 2.

TABLE 2

EFFECT OF DILUTION OF ULTRAFILTRATION RETENTATES ON CRYODESTABILIZATION OF CASEIN

| Extent of Ultra-filtration (VCR) | Dilution Before Freezing | % Casein Precipated After Storage at −8° C.[a] 1 wk. | 2 wk. | 3 wk. | 4 wk. |
|---|---|---|---|---|---|
| 4 | none | 94.0(4.8) | 96.8(2.4) | 98.6(0.3) | 99.3(0.5) |
| 4 | to 2X | 96.5(3.2) | 99.0(0.7) | 98.2(0.8) | 99.1(0.8) |
| 4 | to 1X | 95.9(1.7) | 96.3(0.6) | 96.0(1.0) | 96.9(0.2) |
| 6 | none | 98.8(2.2) | 99.6(0.5) | 98.9(1.0) | 99.5(0.5) |
| 6 | to 2X | 98.7(1.7) | 97.0(0.8) | 97.2(1.8) | 98.2(0.8) |
| 6 | to 1X | 97.4(2.4) | 96.7(1.8) | 97.0(2.1) | 96.7(1.5) |

| Analysis of Variance Source | D.F. | Mean Squares | F | Probability |
|---|---|---|---|---|
| Main Effects | | | | |
| Ultrafiltration | 1 | 17.73 | 4.74 | 0.032 |
| Dilution | 2 | 20.16 | 5.35 | 0.000 |
| Time at −8° C. | 3 | 8.90 | 2.38 | 0.075 |
| 2-Way Interactions | | | | |
| UF × time | 3 | 16.11 | 4.31 | 0.007 |
| UF × dilution | 2 | 16.54 | 4.42 | 0.015 |
| Time × dilution | 6 | 4.21 | 1.13 | 0.353 |
| Error | 95 | 3.74 | | |

[a]Arithmetic means of 4–8 samples from 4 ultrafiltration trials. Standard deviations are enclosed in parentheses.

From an analysis of the variance among the samples, it will be appreciated that: (1) no significant changes in the percentage of casein precipitated occurred as a function of storage time at −8° C.; (2) ultrafiltration to a 6X VCR caused significantly ($p<0.05$) greater precipitation of casein than did ultrafiltration to a 4X VCR; (3) dilution to a 1X VCR, but not to 2X VCR a significant ($p<0.05$) decrease in the amount of casein precipitated as compared to undiluted samples; and (4) although dilution to a 1X VCR caused a decrease in casein precipitation, this decrease was not large, as over 96% of the casein was precipitated in these samples. Dilution to a 2X or 1X VCR reduced the volume of the precipitated protein following centrifugation to approximately ⅓ and 1/5 of the total sample volume, respectively.

The results on the second approach, the addition of water to (or washing) the thawed undiluted ultrafiltration retentates, appear in Table 3.

TABLE 3

EFFECT OF DILUTION OF ULTRAFILTRATION RETENTATES BEFORE OR FOLLOWING FREEZING ON CASEIN CRYODESTABILIZATION

| Extent of Ultra-filtration | Type of Dilution[a] | % Casein Precipitated After Storage at −8° C.[b] 4 Days | 7 Days | 14 Days | 21 Days |
|---|---|---|---|---|---|
| 4 | Dilution | 95.5(3.3) | 93.0(2.2) | 93.0(2.2) | 92.5(0.6) |
| 4 | Wash | 92.8(2.9) | 94.0(4.1) | 94.8(2.6) | 95.3(1.0) |
| 6 | Dilution | 91.5(2.4) | 94.3(3.8) | 93.0(1.8) | 96.5(2.4) |
| 6 | Wash | 90.8(6.7) | 92.2(5.7) | 94.2(2.6) | 94.0(2.3) |

| Analysis of Variance Source | D.F. | Mean Squares | F | Probability |
|---|---|---|---|---|
| Main Effects | | | | |
| Ultrafiltration | 1 | 5.64 | 0.53 | 0.469 |
| Dilution or Wash | 1 | 0.14 | 0.01 | 0.909 |
| Time at −8° C. | 3 | 10.39 | 0.98 | 0.408 |
| Error | 58 | 10.60 | | |

[a]Samples were ultrafiltered to 4X and 6X VCRs. "Dilution" samples were diluted to a 1X VCR before freezing. "Wash" samples were frozen as is, thawed, and then washed with a volume of water that resulted in a final VCR of 1.0.
[b]Arithmetic means of 4 samples from 2 ultrafiltration trials. Standard deviations are enclosed in parentheses.

In these experiments, the effects of diluting the retentate before freezing (dilution) and diluting the retentate after thawing (washing) were compared. Both retentate samples which had been ultrafiltered to 4X VCR and retentate samples which had been filtered to 6X VCR were used. The washing procedure which was employed is described above. A quantity of water was added to both the dilution samples and the washing samples so that the final VCR before centrifuging was 1X. Both sets of samples were analyzed for casein precipitation after 4, 7, 14, and 21 days of storage at −8° C.

Analysis of the variance among the washed and diluted samples indicated no significant differences occurred as functions of the extent of ultrafiltration or time of storage at −8° C. It was found that the extent of casein precipitation when the sample was washed was approximately equal to the extent of casein precipitation when samples were diluted before freezing. This finding is advantageous because washing cryocasein after freezing, rather than dilution of retentate prior to freezing, greatly reduces the amount of water that must be frozen and thus reduces the energy requirement for that processing step.

As discussed above, the data presented in Table 1 indicate that as the extent of ultrafiltration increased, the rate and extent of casein precipitation increased. However, ultrafiltration much beyond a 6X VCR is not practical because of the high viscosity of the retentate. If further separation of components is desired, diafiltration should be used. The effects of ultrafiltration and diafiltration on casein precipitation are illustrated in Table 4.

TABLE 4

EFFECT OF DIAFILTRATION ON CRYODESTABILIZATION OF CASEIN

| Extent of Diafiltration (VCR)[a] | Dilution Before Freezing | % Casein Precipitated After Storage at −8° C.[b] 1 wk. | 2 wk. |
|---|---|---|---|
| 1 | to 1X | 96(3.0) | 93(2.0) |
| 2 | to 1X | 70(29) | 93(0.8) |
| 1 | to 1X | 96(3.0) | 93(2.0) |
| 2 | to 1X | 70(29) | 93(0.8) |
| 4 | to 1X | 60(36) | 85(12) |
| 6 | to 1X | 64(29) | 94(6.0) |

| Analysis of Variance Source | D.F. | Mean Squares | F | Probability |
|---|---|---|---|---|
| Main Effects | | | | |
| Diafiltration | 3 | 696 | 1.875 | 0.158 |
| Time | 1 | 2907 | 7.823 | 0.009 |
| Error | 27 | 371 | | |

[a]Skim milk was ultrafiltered to a 6X VCR and then diluted with distilled water to a 1X VCR. This solution was then diafiltered to a 6X VCR with samples taken at VCRs of 2, 4, and 6. All samples were diluted to a 1X VCR before freezing.
[b]Arithmetic means of 4 samples from 2 diafiltration trials. Standard deviation is enclosed in parentheses.

Skim milk was ultrafiltered to a 6X VCR and then diluted to a 1X VCR with distilled water. In Table 4, this sample is identified as diafiltration (VCR)=1. It should be noted that this sample was prepared identically to the sample in Table 2 which was ultrafiltered to a 6X VCR and then diluted to a 1X VCR before freezing. Ultrafiltration (diafiltration) then proceeded with samples taken at 2, 4, and 6X VCRs. All samples were diluted to a 1X VCR before freezing. As seen in Table 4, diafiltration did not accelerate casein precipitation, when compared to ultrafiltration. The trend, although not statistically significant at the 95% confidence level, was towards decreased casein precipitation.

A possible explanation for this result is that the expected destabilizing effect of further lactose removal by diafiltration was off-set by the concomitant removal of calcium and/or phosphorous. From the tests conducted using diafiltration, it was concluded that diafiltration would likely not be a commercially viable method for isolating native casein.

The data discussed so far have only been concerned with casein. The effect of ultrafiltration and storage at −8° C. on the whey proteins was also investigated and the results are shown in Table 5.

TABLE 5

EFFECT OF EXTENT OF ULTRAFILTRATION AND DILUTION BEFORE FREEZING ON WHEY PROTEIN PRECIPITATION

| Extent of Ultra-filtration (VCR) | Dilution Before Freezing | % of Whey Proteins Precipitated After Storage at −8° C.[a] 1 wk. | 2 wk. | 3 wk. | 4 wk. |
|---|---|---|---|---|---|
| 4 | none | 43.3(12.8) | 34.5(3.6) | 35.4(12.0) | 31.4(2.3) |
| 4 | to 2X | 14.9(6.0) | 19.6(6.7) | 30.6(3.9) | 25.2(1.2) |
| 4 | to 1X | 14.8(5.4) | 16.0(12.7) | 21.6(3.9) | 26.4(2.2) |
| 6 | none | 45.9(11.0) | 47.8(9.1) | 41.4(19.9) | 45.9(4.6) |
| 6 | to 2X | 44.7(14.6) | 40.0(11.1) | 44.9(14.9) | 44.6(13.7) |
| 6 | to 1X | 22.4(7.1) | 22.3(4.8) | 25.3(12.9) | 30.4(4.6) |

| Analysis of Variance Source | D.F. | Mean Squares | F | Probability |
|---|---|---|---|---|
| Main Effects | | | | |
| Ultrafiltration | 1 | 3864.20 | 38.51 | 0.000 |
| Dilution | 2 | 3053.17 | 30.43 | 0.000 |
| Time at −8° C. | 3 | 88.85 | 0.89 | 0.452 |
| 2-Way Interactions | | | | |
| UF × time | 3 | 46.03 | 0.46 | 0.712 |
| UF × dilution | 2 | 673.53 | 6.71 | 0.002 |
| Time × dilution | 6 | 158.24 | 1.58 | 0.162 |
| Error | 95 | 100.34 | | |

[a]Arithmetic means of 4–8 samples from 4 ultrafiltration trials. Standard deviations are enclosed in parentheses.

Analysis of variance showed that: (1) there was no significant change in the percentage of whey proteins precipitated as a function of storage time at −8° C.; (2) ultrafiltration to a 6X VCR caused significantly ($p<0.05$) greater precipitation of whey proteins than did ultrafiltration to a 4X VCR; and (3) dilution to either a 2X or 1X VCR caused a significant and appreciable decrease in whey protein precipitation.

Comparing the values in Table 5 to those in Table 1 indicates that for all samples the percentage of whey proteins precipitated was much less than the percentage of casein precipitated. The relatively large decrease in whey protein precipitation when samples are diluted prior to freezing is possibly related to an entrapment phenomenon. That is, when samples are frozen at a high VCR (e.g., 4X or 6X), some whey proteins may be trapped in the casein precipitate, which as previously described comprises the major volume of these samples. Dilution before freezing decreases the relative volume of casein precipitate and thus the potential for entrapment of soluble whey proteins.

Although analysis of variance indicated that ultrafiltration had a significant effect on whey protein precipitation, when one looks only at samples diluted to a 1X VCR, there is no significant effect due to ultrafiltration. Looking only at samples diluted to 1X eliminates entrapment effects because these samples, although ultrafiltered to different exents, have the same final casein concentration. Thus, it appears that ultrafiltration to a 4X or 6X VCR causes approximately one-fourth of the whey proteins to precipitate. This precipitation may not be fully explained by an entrapment phenomenon.

This interpretation is supported by data presented in Table 6.

TABLE 6

EFFECT OF DILUTION OF ULTRAFILTRATION RETENTATES PRIOR TO OR FOLLOWING FROZEN STORAGE ON WHEY PROTEIN PRECIPITATION

% of Whey Proteins

TABLE 6-continued

EFFECT OF DILUTION OF ULTRAFILTRATION RETENTATES PRIOR TO OR FOLLOWING FROZEN STORAGE ON WHEY PROTEIN PRECIPITATION

| Extent of Ultra-filtration | Type of Dilution[a] | Precipitated After Storage at −8° C.[b] 4 Days | 7 Days | 14 Days | 21 Days |
|---|---|---|---|---|---|
| 4 | Dilution | 39(25) | 34(15) | 26.8(5.0) | 33(2.2) |
| 4 | Washing | 32(16) | 20(5.2) | 26.8(2.9) | 27(5.0) |
| 6 | Dilution | 34(20) | 20(17) | 30.0(1.3) | 36(3.9) |
| 6 | Washing | 35(18) | 23(7.9) | 25.0(1.7) | 28(4.2) |

| Analysis of Variance Source | D.F. | Mean Squares | F | Probability |
|---|---|---|---|---|
| Main Effects | | | | |
| Ultrafiltration | 1 | 17.02 | 0.13 | 0.718 |
| Time at −8° C. | 3 | 363.18 | 2.81 | 0.047 |
| Dilution or Wash | 1 | 310.64 | 2.40 | 0.126 |
| Error | 58 | 129.21 | | |

[a]Samples were ultrafiltered to a 4X and 6X VCR. "Dilution" samples were diluted to a 1X VCR before freezing. "Wash" samples were frozen as is, thawed, and then washed with a volume of water that resulted in a final VCR of 1.0.
[b]Arithmetic means of 4 samples from 2 ultrafiltration trials. Standard deviations are enclosed in parentheses.

In these experiments, samples were either diluted before freezing or the precipitate from frozen and thawed samples was washed with a volume of water that resulted in a final VCR of 1.0. Analysis of variance indicated that neither the extent of ultrafiltration (4X or 6X VCR) nor the time of dilution (before or after freezing) had a significant effect on whey protein precipitation. If one assumes that washing the precipitate would eliminate any appreciable entrapment of whey proteins, then ultrafiltration must be altering the composition of the samples and causing their precipitation. Thus, it is believed that lactose may stabilize whey proteins, as well as casein, during frozen storage.

Several experiments were conducted to determine if removal of lactose was the mode of action responsible for observed cryodestabilization of casein. The data presented in Table 7 compare cryodestabilization of casein in control and ultrafiltered (to a 6X VCR and diluted to a 1X VCR with water) samples and samples that were: (1) ultrafiltered and recombined (permeate added back to the retentate) to give a product that was identical in composition to the control; and (2) samples that were ultrafiltered to a 6X VCR and diluted to a 1X VCR with a 5% (w/v) lactose solution so that the lactose was replaced, but not the other low molecular weight components such as calcium and phosphorus that were removed during ultrafiltration.

TABLE 7

EFFECT OF ULTRAFILTRATION FOLLOWED BY REPLACEMENT OF LACTOSE OR RECOMBINATION OF THE RETENTATE AND PERMEATE ON CASEIN PRECIPITATION DURING FROZEN STORAGE

| Sample[a] | % Casein Precipitated Week Storage Time at −8° C.[b] 1 wk. | 2 wk. | 3 wk. |
|---|---|---|---|
| Control | 3(1-5) | 14(0-33) | 16(6-27) |
| 6X UF + $H_2O$ | 97(94-99) | 97(95-99) | 97(95-99) |
| 6X UF + Permeate | 4(0-9) | 15(8-23) | 18(18) |
| 6X UF + Lactose | 0(0) | 6(0-12) | 8(1-14) |

[a]Control samples were not ultrafiltered. Other samples were ultrafiltered to a 6X VCR and then diluted to a 1X VCR with either water, permeate from ultrafiltration, or a 5.0% (wt/vol) lactose solution.
[b]Values are the arithmetic mean and range (in parentheses) of 2-7 samples from 4 ultrafiltration runs.

These data indicate that removal of lactose was indeed the cause of the greatly increased amount of cryodestabilization observed in ultrafiltered samples. This is in accord with the previously discussed literature on the role of carbohydrates as cryoprotectants. See, e.g., Minson et al, *Efficacy of Various Carbohydrates as Cryoprotectants for Casein in Skim Milk,* 46 *J. Food Sci.* 1957 (1981).

The effect of lactose on whey protein cryodestabilization is illustrated in Table 8.

TABLE 8

EFFECT OF ULTRAFILTRATION AND REPLACEMENT LACTOSE ON CRYODESTABILIZATION OF WHEY PROTEINS

| Sample[a] | % of Whey Proteins Precipitated After Storage at −8° C.[b] 1 wk. | 2 wk. | 3 wk. |
|---|---|---|---|
| Lactose Removed | 12(8.6) | 28(11) | 16(11) |
| Lactose Replaced | 6(6.7) | 20(3.5) | 0.6(1.2) |

| Analysis of Variance Source | D.F. | Mean Squares | F | Probability |
|---|---|---|---|---|
| Main Effects | | | | |
| Lactose Replacement | 1 | 631.4 | 9.625 | 0.006 |
| Time | 2 | 608.3 | 9.273 | 0.001 |
| Error | 20 | 65.6 | | |

[a]Skim milk was ultrafiltered to a 6X VCR. The "Lactose Removed" sample was diluted with distilled water to a 1X VCR before freezing and the "Lactose Replaced" sample was diluted with 5% (wt/vol) lactose to a 1X VCR before freezing.
[b]Arithmetic means of 4 samples from 2 ultrafiltration trials. Standard deviations are in parentheses.

In these experiments, skim milk was ultrafiltered to a 6X VCR and diluted to a 1X VCR with either distilled water or a 5% (w/v) lactose solution. Analysis of variance indicates that lactose has a significant effect on whey protein cryodestabilization. Thus, it appears that lactose stabilizes whey proteins, as well as casein, during frozen storage.

The phenomenon of cryodestabilization in normal milk is caused by storage at high sub-freezing temperatures and is not caused by freezing and thawing per se. This area was briefly investigated for skim milk which was ultrafiltered to a 6X VCR and then diluted to a 1X VCR. The results are shown in Table 9.

TABLE 9

EFFECT OF STORAGE AT +4° C., −8° C. OR FREEZING AND THAWING ON CASEIN PRECIPITATION IN ULTRAFILTERED SKIM MILK

| Storage Condition[a] | % Casein Precipitated[b] |
|---|---|
| 4° C./1 day | 4(4-5) |
| −8° C./1 day | 42(29-67) |
| Freeze/Thaw | 10(7-16) |

[a]All samples were milk ultrafiltered to a 6X VCR and diluted to a 1X VCR with water. Samples stored at 4° C. were never frozen. Samples stored at −8° C. for 1 day were first frozen in air at −20° ± 2° C. for 20-24 hours. Freeze/thaw samples were frozen in still air at −20° ± 2° C. for 20-24 hours and then thawed in ethanol at 0-5° C. for 1-1.5 hrs.
[b]Values are the mean and range of 2-7 samples from 4 ultrafiltration trials.

Storage at 4° C. for 1 day or freezing and thawing did not cause appreciable casein precipitation, but samples of ultrafiltered and diluted milk held at −8° C. for 1 day showed a variable but appreciable extent of casein precipitation.

Since casein is typically precipitated from milk by lowering the pH to approximately 4.6, the pH of the thawed samples was determined to see if changes which could play a role in cryodestabilization occurred in these samples. The data presented in Table 10 indicates that: (1) ultrafiltration to a 6X VCR causes a slight (approximately 0.1 unit) increase in pH; (2) dilution of ultrafiltration retentates causes a further slight increase in pH of the thawed samples; and (3) pH of the thawed samples does not change appreciably with storage time at −8° C., even though considerable cryodestabilization is occurring (refer to Tables 1 and 2).

TABLE 10

EFFECT OF ULTRAFILTRATION AND STORAGE AT −8° C. ON pH OF SKIM MILK AFTER THAWING

| Ultra-filtration VCR | Dilution to a 1X VCR | pH after days storage at −8° C.[a] 0 | 1 | 3 | 9 | 14 |
|---|---|---|---|---|---|---|
| 1 (control) | — | 6.83 | 6.80 | 6.77 | 6.83 | 6.84 |
| 2 | No | 6.91 | 6.89 | 6.87 | 6.94 | 6.89 |
| 4 | No | 6.93 | 6.90 | 6.87 | 6.94 | 6.90 |
| 6 | No | 6.93 | 6.93 | 6.91 | 6.96 | 6.92 |
| 2 | Yes | 7.02 | 7.00 | 6.98 | 7.06 | 6.99 |
| 4 | Yes | 7.18 | 7.15 | 7.12 | 7.20 | 7.14 |
| 6 | Yes | 7.28 | 7.24 | 7.20 | 7.27 | 7.22 |

[a]Samples were thawed at 0-5° C. for 1-1.5 hours and pH was measured at 0° C. Values are means of single determinations on duplicate samples (except for values at 0 days which are from single samples) from a single ultrafiltration trial.

Since increasing pH increases the distance from the isoelectric point of casein (pH 4.6), it was concluded that cryodestabilization is not caused by pH changes.

Although these pH measurements were made on thawed samples, previous studies (Van den Berg,. *Changes in pH of Milk During Freezing and Frozen Storage,* 44 *J. Dairy Sci.* 26 (1961)) indicate that the difference between the pH of frozen and thawed samples is small.

As discussed earlier, one reason for interest in isolation of native casein by cryodestabilization was that it may be a reversible precipitation. To evaluate the dispersability of cryodestabilized casein, fresh acid casein was prepared by the method of Aoki and Imamura, supra. Cryodestabilized casein was prepared from skim milk ultrafiltered to a 6X VCR, diluted to a 1X VCR, frozen, and stored at −8° C. for 2 weeks. Both acid casein and cryodestabilized casein were freeze-dried and then dissolved in distilled water to make a 3% (w/v) solution. Samples were then agitated in a water bath at 55° C. for 30 minutes and centrifuged at 1,000×g max for 5 minutes. The volume and concentration of casein in the supernatant fluid were determined and the percentage of the total casein present in the supernatant fluid was calculated. The results are shown in Table 11.

TABLE 11

RESUSPENSION OF ACID CASEIN AND CRYOCASEIN

| Sample | % Total Casein Resuspended[a] |
|---|---|
| Acid Casein | <0.1 |
| Cryodestabilized casein | 99(98–100) |

[a]A three percent wt/vol (dry wt. basis) solution of casein was dispersed in distilled $H_2O$, agitated at 55° C. for 30 minutes and centrifuged at 1000 × g for 5 minutes. Values are the mean and range of 4 samples.

Acid casein, as expected, is insoluble, whereas cryocasein was almost completely resuspended by the procedure used here. Thus, it appears that under the conditions employed, cryodestabilization is indeed a reversible reaction.

Although the invention has been described in detail with reference to certain embodiments and examples, variations and modifications exist within the scope and spirit of the invention as described and defined in the following claims.

What is claimed is:

1. A method for processing milk to isolate substantially all of the native casein therefrom in a form capable of forming a stable suspension in water, which comprises the steps of filtering milk through a membrane which substantially completely retains native casein while generally allowing lactose and water to pass through, withdrawing the retentate, storing the retentate at a temperature below the freezing point thereof, thawing the retentate, and separating the native casein therefrom in the presence of added water.

2. The method of claim 1 wherein the step of filtering the milk comprises the step of filtering the milk to at least about 2X VCR.

3. The method of claim 1 wherein the step of filtering the milk comprises the step of filtering the milk to at least about 4X VCR.

4. The method of claim 1 wherein the step of filtering the milk comprises the step of filtering the milk to between about 4X and 6X VCR.

5. The method of claim 1 wherein the step of filtering the milk comprises the step of filtering the milk by ultrafiltration.

6. The method of claim 1 wherein the step of filtering the milk comprises the step of filtering the milk by diafiltration.

7. The method of claim 1 wherein the step of storing the retentate comprises the step of storing the retentate for at least about four days.

8. The method of claim 1 wherein the step of storing the retentate comprises the step of storing the retentate for between about four days and four weeks.

9. The method of claim 1 wherein the step of storing the retentate comprises the step of storing the retentate at about −8° C.

10. The method of claim 1 wherein the step of separating the native casein in the presence of added water includes the step of adding water to the retentate in amounts sufficient to prevent gelling of the retentate.

11. The method of claim 10 wherein the step of adding water is performed before the retentate is stored.

12. The method of claim 10 wherein the step of adding water is performed after the retentate is stored.

13. The method of claim 10 wherein the step of adding water comprises the step of adding a sufficient quantity of water to bring the retentate to at least about 2X VCR.

14. The method of claim 1 wherein the step of substantially separating the native casein in the presence of added water comprises the step of centrifuging the retentate.

15. The method of claim 1 wherein the step of filtering milk comprises the step of filtering skim milk.

16. A method of isolating native casein from milk comprising the steps of filtering milk through a membrane of a type through which casein generally will not pass to concentrate the milk filtered to at least about 2X VCR, saving the retentate from the filtration process, storing the retentate for at least about four days at a temperature below the freezing point of the retentate, thawing the retentate, diluting the retentate with a suitable diluent in amounts sufficient to prevent gelling of the retentate, and substantially separating the casein from the diluent and other materials in the retentate.

17. A native casein isolate which is substantially dispersible in water, the casein being isolated from milk by a process which essentially completely isolates the casein from the milk, the process comprising the steps of filtering milk through a membrane which substantially completely retains native casein while generally allowing lactose and water to pass through, withdrawing the retentate, storing the retentate at a temperature below the freezing point thereof, thawing the retentate, and separating the native casein therefrom in the presence of added water.

18. The composition of claim 17 wherein the step of filtering the milk comprises the step of filtering the milk to at least about 2X VCR.

19. The composition of claim 17 wherein the step of filtering the milk comprises the step of filtering the milk to at least about 4X VCR.

20. The composition of claim 17 wherein the step of filtering the milk comprises the step of filtering the milk to between about 4X and 6X VCR.

21. The composition of claim 1 wherein the step of filtering the milk comprises the step of filtering the milk by ultrafiltration.

22. The composition of claim 1 wherein the step of filtering the milk comprises the step of filtering the milk by diafiltration.

23. The composition of claim 1 wherein the step of storing the retentate comprises the step of storing the retentate for at least about four days.

24. The composition of claim 1 wherein the step of storing the retentate comprises the step of storing the retentate for between about four days and four weeks.

25. The composition of claim 1 wherein the step of storing the retentate comprises the step of storing the retentate at about $-8°$ C.

26. The composition of claim 18 wherein the step of separating the native casein in the presence of added water includes the step of adding water to the retentate in amounts sufficient to prevent gelling of the retentate.

27. The composition of claim 26 wherein the step of adding water is performed before the retentate is stored.

28. The composition of claim 26 wherein the step of adding water is performed after the retentate is stored.

29. The composition of claim 26 wherein the step of adding water comprises the step of adding a sufficient quantity of water to bring the retentate to at least about 2X VCR.

30. The composition of claim 17 wherein the step of substantially separating the native casein in the presence of added water comprises the step of centrifuging the retentate.

31. The composition of claim 1 wherein the step of filtering milk comprises the step of filtering skim milk.

32. A native casein isolate which is substantially dispersible in water, the casein being isolated from milk by a process comprising the steps of filtering the milk through a membrane through which casein generally will not pass to concentrate the milk filtered to at least about 2X VCR, storing the retentate from the filtration process for at least about four days at a temperature below the freezing point of the retentate, thawing the retentate, diluting the retentate with a suitable diluent in amounts sufficient to prevent gelling of the retentate, and substantially separating the casein from the diluent and other materials in the retentate.

33. A method of isolating native casein from skim milk comprising the steps of first ultrafiltering skim milk through a membrane of a type through which casein generally will not pass to concentrate the milk filtered to between about 4X and 6X VCR, then saving the retentate from the filtration process, then storing the retentate for between about four days and four weeks at a temperature below the freezing point of the retentate, then thawing the retentate, then diluting the retentate with water in amounts sufficient to bring the retentate to at least about 2X VCR, and then substantially separating the casein from the diluent and other materials in the retentate by centrifugation.

* * * * *

UNITED STATES PATENT AND TRADEMARK OFFICE
CERTIFICATE OF CORRECTION

PATENT NO. : 4,462,932

DATED : July 31, 1984

INVENTOR(S) : Dennis A. Lonergan

It is certified that error appears in the above-identified patent and that said Letters Patent is hereby corrected as shown below:

Column 8, line 68, delete "% of Whey Proteins".

Column 9, line 5, directly above "Precipitated After", insert --% of Whey Proteins--.

Column 13, line 23, delete "1" and insert --17-- therefor.

Column 13, line 26, delete "1" and insert --17-- therefor.

Column 13, line 29, delete "1" and insert --17-- therefor.

Column 13, line 32, delete "1" and insert --17-- therefor.

Column 13, line 35, delete "1" and insert --17-- therefor.

Column 13, line 38, delete "18" and insert --17-- therefor.

Column 14, line 11, delete "1" and insert --17-- therefor.

Signed and Sealed this

*Twenty-second* Day of *January 1985*

[SEAL]

*Attest:*

DONALD J. QUIGG

*Attesting Officer* *Acting Commissioner of Patents and Trademarks*